Figure 1:
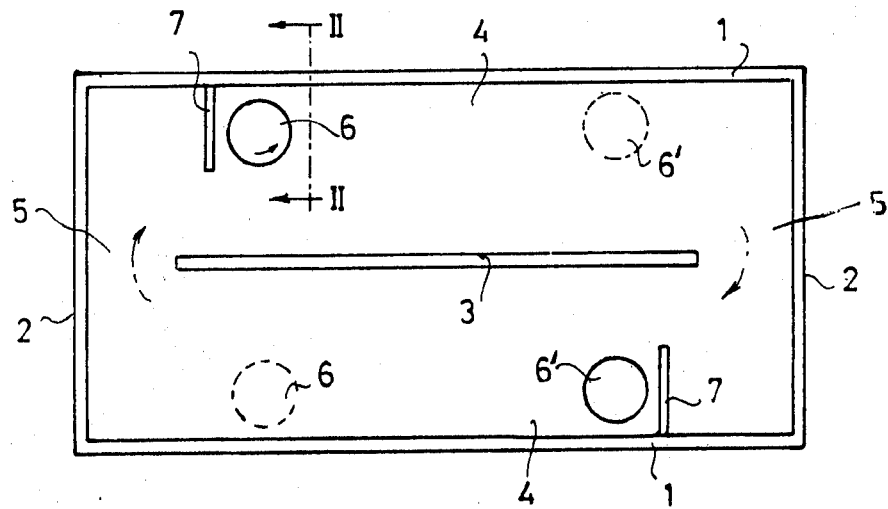

United States Patent

Pepping

[11] 4,062,911
[45] Dec. 13, 1977

[54] DEVICE FOR THE PURIFICATION OF WASTE WATER

[75] Inventor: Roelf Pepping, Sneek, Netherlands

[73] Assignee: Landustrie Sneek Machinefabriek Elektrotechniek B.V., Netherlands

[21] Appl. No.: 715,477

[22] Filed: Aug. 18, 1976

[30] Foreign Application Priority Data

Aug. 27, 1975  Netherlands .................. 7510116

[51] Int. Cl.$^2$ .............................................. B01F 3/04
[52] U.S. Cl. .................................................... 261/91
[58] Field of Search ............... 210/15, 17, 150, 151, 210/170, 221; 261/91

[56] References Cited

U.S. PATENT DOCUMENTS

| 3,208,734 | 9/1965 | Wood et al. | 261/91 X |
|---|---|---|---|
| 3,320,160 | 5/1967 | Welles, Jr. et al. | 261/91 |
| 3,323,782 | 6/1967 | Clough | 261/91 |
| 3,473,790 | 10/1969 | Auler et al. | 261/91 |
| 3,510,110 | 5/1970 | Klein | 261/91 |
| 3,576,316 | 4/1971 | Kaelin | 261/91 |
| 3,814,395 | 6/1974 | Kaelin | 261/91 |
| 3,855,370 | 12/1974 | Dodd | 210/170 |
| 3,897,525 | 7/1975 | Auler | 261/91 |

*Primary Examiner*—Theodore A. Granger
*Attorney, Agent, or Firm*—William Anthony Drucker

[57] ABSTRACT

The disclosure relates to a device for the purification of waste water with the aid of active silt, comprising an open basin or the like with supply and discharge means for the water, in which basin a partition is provided in such a manner that a closed circulating channel is obtained, a rotatable aerator with a vertical axis being mounted in such manner and adapted to be driven in such a sense that on rotation thereof the water is circulated in said closed channel, characterized in that one or more aerator are mounted near an outer wall or a partition of the basin.

1 Claim, 2 Drawing Figures

DEVICE FOR THE PURIFICATION OF WASTE WATER

Waste water is often purified by means of microorganisms present in active silt and by supplying oxygen. To that end the water to be purified is supplied to a basin containing the active silt, and is removed therefrom after a given residence time. The oxygen supply takes place, for instance, by means of a surface aerator, comprising a rotatable body adapted to disturb the water surface and, thus, to introduce oxygen into the water. For this purpose different types of surface aerators for aeration basins are known.

A special type of such a purification device comprises an elongated open basin with a median partition extending in the longitudinal direction of the basin but not as far as the extremities thereof, so that a closed path for circulating the water is obtained. For keeping the contents of the basin moving and for supplying oxygen often surface aerators with a horizontal axis are used.

It has already been proposed to use an aerator with a vertical axis in a device with a closed circulating path, which aerator is, then, arranged in the part between an extremity of the partition and the adjacent transverse wall of the basin, its axis being situated in the plane of the partition. With such a device an improvement in respect of similar devices with a horizontal rotation axis can be obtained.

However this improved device has still some drawbacks. For the aerator is designed for a given expected capacity. If, however, the capacity is to be increased, the aerator must be replaced by an aerator with a larger rotor, so that, then, a part of the partition has to be removed, and in some cases also the bridge on which the aerator is suspended has to be adapted. It is, of course, possible to arrange a second aerator at the other extremity of the partition, but this is only feasible if this is taken into account when constructing the basin, and for supporting this aerator a relatively expensive bridge spanning the basin has to be provided.

The invention provides a device of the kind mentioned above, in which the number of aerators can be increased in a simple and economic manner so as to obtain an adaptation to an increased capacity without requiring to take this into account beforehand, and without requiring thorough changes in the basin.

To that end the device according to the invention is characterised in that the aerator or aerators are positioned near an outer wall or a partition wall of the basin. Mounting an aerator in the vicinity of such a wall does not require a bridge spanning the basin, and the number of aerators can be increased in a simple manner. Another advantage of such an arrangement is that the maintenance is simplified.

Moreover a baffle which is transversely directed to the wall in question can be positioned behind such an aerator, as seen in the direction of liquid flow, for preventing the occurrence of flows opposite to the desired displacement direction.

The invention will be elucidated below by reference to a drawing, showing in:

FIG. 1 a schematic top view of a device according to the invention; and

Figure 2:
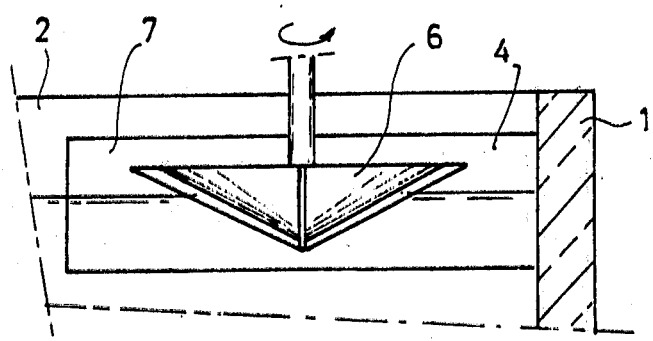

FIG. 2 a partial section according to line II—II of FIG. 1.

The purification device shown comprises a rectangular basin, for instance made of concrete, defined by two longitudinal walls 1 and two transversal walls 2. In the longitudinal median plane a partition 3 is provided extending not as far as the transversal walls 2.

In this manner a closed channel having two straight parts 4 and two connecting parts 5 is obtained. The water to be purified is supplied to the channel with the aid of means not shown in the drawing, and the purified water from this channel at a point separated from the supply point after having contacted the active silt present in this channel for a given time duration.

For aerating the water and circulating it through said channel surface aerators 6 with a vertical axis are used which are mounted near the longitudinal walls 1, which simplifies their mounting and maintenance considerably. In the case shown two aerators of this kind are provided. If an increased capacity is required, additional aerators can be added, as is indicated at 6', which does not require special provisions when constructing the basin.

These aerators are driven in the indicated direction of rotation for circulating the water in the desired direction. But then an oppositely directed flow may be generated along the wall in question. In order to prevent this it is advisable to arrange a transverse baffle 7 behind each aerator which can stop such a counter-current.

Such aerators can be fixed to the wall in a simple manner without the necessity of a bridge spanning the basin. It is also possible to mount such aerators near the transverse walls 2 or against the partition 3. Furthermore it is possible to provide several partitions in such an aeration basin for defining a plurally curved closed channel, and the aerators can be positioned again along the various walls.

I claim:

1. In a device for aerating waste liquid by the activated sludge method, in combination:
   i. a first pair of opposed walls which are elongated and spaced and substantially parallel
   ii. a second pair of opposed walls which are disposed transversely to said elongated walls and which are spaced and substantially parallel and are shorter than said elongated walls
   iii. a partition disposed substantially parallel to and equidistantly between said elongated walls, said partition being of shorter length than said elongated walls and being disposed with its end substantially equidistantly spaced from said transverse walls, whereby the entirety of said walls and said partition together bound a horizontal closed loop path for flow of liquid, said path including elongated substantially linear side path portions defined between the partition and the respective elongated walls, and connecting path portions between each end of said partition and the respective transverse walls,
   iv. at least one surface aerator including an aerator body rotatable about a vertical axis, said surface aerator being disposed in one of said linear side path portions and fixedly mounted with its periphery at a small radial distance from one of said elongated walls and at a substantial distance from the partition, said surface aerator when rotated causing a flow of liquid along said linear side path portion between said periphery and said partition in a direction corresponding to the direction of rotation of the aerator, and
   v. baffle means positioned in said side path portion upstream of said surface aerator, considered in the direction of liquid flow in the horizontal closed path, said baffle means extending from said elongated wall transversely of said flow path portion towards said partition, said baffle means being of such a length that it does not substantially extend into the flow of liquid between the surface aerator and said partition.--

* * * * *